United States Patent [19]

Markert et al.

[11] Patent Number: 5,496,892
[45] Date of Patent: Mar. 5, 1996

[54] OXAZOLIDINONE STRUCTURES-CONTAINING PREPOLYMERIC EPOXY RESIN MIXTURE

[75] Inventors: Helmut Markert, Nuremberg; Klaus Kretzschmar, Erlangen; Michael Schreyer, Weisendorf; Günter Mennig, Darmstadt; Peter Braun, Hungen; Oliver Eitel, Leingarten, all of Germany

[73] Assignee: Siemens Aktiengesellschaft, Munich, Germany

[21] Appl. No.: 367,282

[22] PCT Filed: Jul. 2, 1993

[86] PCT No.: PCT/DE93/00582

§ 371 Date: Jan. 12, 1995

§ 102(e) Date: Jan. 12, 1995

[87] PCT Pub. No.: WO94/02527

PCT Pub. Date: Feb. 3, 1994

[30] Foreign Application Priority Data

Jul. 17, 1992 [DE] Germany .......................... 42 23 622.3

[51] Int. Cl.$^6$ .............................. B29F 3/00; C08K 3/34; C08K 3/22; C08K 3/26
[52] U.S. Cl. ...................... 525/528; 528/73; 264/211.24; 525/504
[58] Field of Search ................... 264/211.24; 525/528, 525/504; 528/73

[56] References Cited

U.S. PATENT DOCUMENTS

| 4,562,227 | 12/1985 | Rogler et al. | 524/786 |
| 4,612,156 | 9/1986 | Heinemeyer et al. | 264/176 R |
| 4,631,306 | 12/1986 | Markert et al. | 523/457 |
| 5,112,932 | 5/1992 | Koenig et al. | 528/51 |

FOREIGN PATENT DOCUMENTS 0296450 12/1988 European Pat. Off. .

*Primary Examiner*—Frederick Krass
*Attorney, Agent, or Firm*—Kenyon & Kenyon

[57] ABSTRACT

In a process for producing a prepolymer epoxy resin mixture with oxazolidinone structures, a filler-containing thermally polymerizable reaction resin mixture of polyepoxy resin, consisting of a mixture of di- and multifunctional epoxy resins, and polyisocyanate resin, with a molar ratio of the epoxy groups to the isocyanate groups of >1, is fed to a continuously working reactor. With substituted imidazole as reaction accelerator, amounting to 0.5–2.5% of the polyepoxy resin, the reaction resin mixture is then reacted at temperatures up to 200° C., with reactor temperature at 140°–190° C., and following that the extruded material is cooled down to a temperature of <50° C. with the aid of a cooling device mounted at the outlet die of the reactor.

17 Claims, No Drawings

OXAZOLIDINONE STRUCTURES-CONTAINING PREPOLYMERIC EPOXY RESIN MIXTURE

BACKGROUND OF THE INVENTION

1. Field of the Invention

The invention relates to a process for making an oxazolidinone structures-containing prepolymeric epoxy resin mixture and to an apparatus for carrying out said process.

2. Description of Related Art

It is known from WO 90/15089 that epoxide-terminated polyoxazolidinones (in that document referred to simply as polyoxazolidones) can be prepared by reaction of a polyepoxide and a polyisocyanate at elevated temperature in the presence of a catalyst. To this end, from 5 to 30 wt % of the poly-isocyanate is added within 30 to 90 min to a mixture of 70 to 95 wt % of the polyepoxide and 0.01 to 2 wt % of the catalyst, and the resulting reaction mixture is then heated at a temperature of 110° to 200° C. for a period of 5 to 180 minutes. By regulating various process parameters, the process is carried out so that in the resulting epoxy-terminated poly-oxazolidinone, which is also referred to as isocyanate-modified epoxy resin, 50 to 100% of the original isocyanate groups are converted into oxazolidinone rings and 0 to 50% into isocyanurate rings.

In the known process, the polyepoxide is, in particular, bisphenol A or tetrabromobisphenol A, and the polyisocyanate is 4,4'-methylene-bis(phenyl isocyanate) (MDI) or an isomer thereof, polymeric MDI or toluylene diisocyanate. A suitable catalyst (for the reaction of the polyepoxide and the polyisocyanate) is, in particular, an imidazole or tetraphenylphosphonium bromide. The catalyst concentration is preferably from 0.02 to 1 wt %, particularly 0.02 to 0.1 wt %, based on the total weight of the polyepoxide and the polyisocyanate.

To prepare the polyoxazolidinones, the catalyst, optionally dissolved in a suitable solvent, is added to the polyepoxide, in general at a temperature below the reaction temperature of 110° to 200° C. The temperature is then raised to the reaction temperature and kept at this level while adding the polyisocyanate under controlled conditions, namely dropwise.

A similar process, known from EP 0 296 450 A1, is used for making oxazolidinone groups- (in that document referred to simply as oxazolidone groups) containing oligomeric polyepoxides from bisepoxides and diisocyanates. By this process, either a bisepoxy ether with OH groups corresponding to a hydroxyl number of at least 2 is made to react with an aromatic diisocyanate containing two NCO groups of different reactivity in an amount of at least ¼ of the weight of the diisocyanate, or a bisepoxy ester with OH groups corresponding to a hydroxyl number of at least 2 is made to react with an aromatic, aliphatic or cycloaliphatic diisocyanate in a weight ratio of NCO groups to epoxide groups of 1:1.4 to 1:2.5—both reactions being carried out in the presence of a phosphonium salt as catalyst at 140° to 180° C. The catalyst is used in an amount of 0.005 to 1.0 wt %, preferably 0.01 to 0.5 wt %, based on the bisepoxide.

In this process, it is essential that the oxazolidinone epoxy resins are obtained only when OH groups-containing epoxy resins are made to react with diisocyanates containing NCO groups of different reactivity, in the presence of a phosphonium salt as catalyst at about 160° C. To prepare the polyepoxide, the bisepoxy resin and the catalyst are heated to 160° C. under nitrogen. The diisocyanate is then added dropwise to the melt at a rate such that a temperature of about 170° C. is maintained. After all the diisocyanate has been added, the mixture is allowed to agitate at 160° C. until the calculated epoxide content has been reached and reactive NCO can no longer be detected.

Both known processes have been described only for laboratory batch sizes. It is essential in this respect that the polyisocyanate be added dropwise to the catalyst-containing polyepoxide. Hence, it is hardly possible to carry out the described processes economically on an industrial scale. Moreover, by these processes only filler-free reaction resin mixtures can be used.

SUMMARY OF THE INVENTION

The object of the invention is to provide an economical process for making an oxazolidinone structures-containing prepolymeric epoxy resin mixture that is storage-stable, soluble or fusible, latently reactive and curable, which process is suitable for industrial production.

According to the invention, this objective is reached by feeding to a continuous reactor a filler-containing, heat-polymerizable reaction resin mixture of a polyepoxy resin, consisting of a mixture of di- and polyfunctional epoxy resins, and a polyisocyanate resin, with a molar ratio of epoxy groups to isocyanate groups of >1, causing the reaction resin mixture to react at a reaction temperature of up to 200° C., the reactor temperature being from 140° to 190° C., in the presence of a substituted imidazole as catalyst used in the amount of 0.5 to 2.5%, based on the polyepoxy resin, and cooling the extrudate to a temperature of <50° C. with a cooling device located at the outlet die of the reactor.

DETAILED DESCRIPTION OF THE INVENTION

By the process according to the invention, the preparation of the reaction resin mixture and the feeding thereof to the reactor can be accomplished in different ways. By a first variant, a resin component is prepared by mixing the polyepoxy resin, namely the di- and polyfunctional epoxy resins, and the polyisocyanate resin at a temperature of up to 100° C. with agitation in a thermostattable and evacuable mixing vessel equipped, for example, with a helical mixer and permitting continuous temperature measurement of the resin mixture. The filler and optionally other additives are blended into this resin mixture, said mixture then being degassed with agitation at a temperature of up to 100° C. under reduced pressure for at least 1 hour. In a second mixing vessel, a catalyst component is prepared by dissolving or dispersing the catalyst in a resin component of the formulation or in part thereof with degassing. By means of metering pumps, for example a heatable peristaltic pump or a gear pump, the two components are then introduced into a static mixing tube, and the reaction resin mixture discharged from the static mixing tube is fed to the reactor.

A twin-screw extruder is particularly well suited for reaction extrusion of the resin mixture fed via the static mixing tube in the described manner. It is advantageous that the ratio of screw length to outside screw diameter of the extruder be from 20 to 50 and particularly from 25 to 40. Moreover, the extruder is preferably designed so that for a screw speed of >10 rpm the residence time of the material is less than 5 min and preferably less than 3 min and that axial backflow is minimized.

The extruder which is continuously fed with amounts of resin from 20 to 200 g/min contains conveying screw elements (screw diameter, for example, 31.8 mm, screw length:880 mm) and is equipped with five thermostattable barrel zones which are heated, for example, to 160°–180° C. Thus, the residence time available for the conversion of the reaction resin mixture into the prepolymeric epoxy resin mixture in the reactor is less than 3 minutes. The extrudate discharged through a slot die is rapidly cooled to a temperature below 50° C. on a cooled slide-off ramp, the epoxy resin mixture thus solidifying to ribbon-like continuous strips. On a take-off belt, said strips are pulled under a counter-roll and coarsely comminuted. The pre-comminuted product is ground to the desired particle size in an impact mill. The free-flowing, storage-stable, soluble or fusible, latently reactive oxazolidinone structures-containing prepolymeric epoxy resin mixture thus obtained is stored with exclusion of moisture.

By a second variant, the resin component is prepared as in the first case. The catalyst component is prepared by vigorously mixing the catalyst with part of the filler of the formulation and optionally with additives. The two components are then fed to a twin-screw extruder by means of a peristaltic pump or a twin-screw powder-metering device. The difference between this variant and the first one is that the screws in the mixing zone of the extruder which is adjacent to the feeding zone are provided with conveying kneading elements. The temperature in the mixing zone is up to 100° C. The other features of the extruder and the processing conditions are substantially the same as for variant 1.

By a third variant, a resin component is prepared by separately feeding a polyepoxy resin and a polyisocyanate resin, which are liquid and possibly highly viscous, from heatable storage containers by means of piston, membrane or gear pumps at continuous flow rates to a twin-screw mixing extruder or to a twin-screw extruder extended by adding a premixing section. At a different downstream location, a free-flowing premix of catalyst, filler and optionally additives is fed by means of a twin-screw metering device. Downstream of an appropriate partial mixing section, a vacuum system is provided for degassing the material to remove volatile components. The temperatures in the entire mixing section are up to 100° C. The screws of the mixing extruder or the premixing zone of the reaction extruder contain mostly mixing elements. When a separate mixing extruder is used, the resin component is fed with the mixing extruder and the catalyst component is fed to the reaction extruder with a twin-screw metering device, as in the second case. When an extended extruder is used, the catalyst component is fed at the end of the mixing section by means of a twin-screw metering device. From this point on, the conditions are comparable to those prevailing downstream of the feeding zone in the second variant.

The process according to the invention involves the use of a reaction resin mixture of polyepoxy resin and polyisocyanate resin, the polyepoxy resin being a mixture of di- and polyfunctional epoxy resins. The molar ratio of polyfunctional to difunctional epoxy resin is from 0.1 to 1.7, preferably 0.2 to 0.75, based on the epoxy groups. The molar ratio of epoxy groups to isocyanate groups (in the reaction resin mixture) is >1 and preferably 1.5 to 4.0.

According to the process of the invention, suitable epoxy resins used as components of the polyepoxy resin mixture are in particular bisphenol A and bisphenol F epoxy resins, phenol novolak and cresol novolak epoxy resins or silicone epoxy resins, triglycidylisocyanurate, tetraglycidyldiaminodiphenylmethane and polyglycidylphosphorus resins. Particularly suitable silicone epoxy resins are those having the following structure:

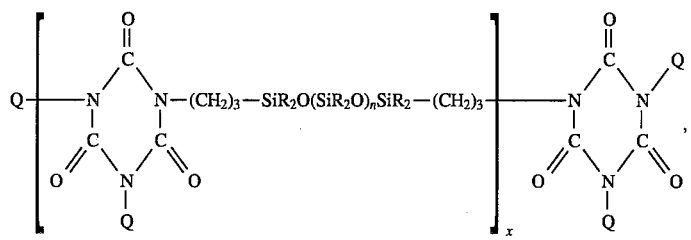

wherein
n is an integer from 0 to 25,
x is an integer from 0 to 3,
R=alkyl or aryl,
$Q=-(CH_2)_3SiR_2O(SiR_2O)_nSiR_2R^1$,
n and R having the afore-indicated meaning and $R^1$ denoting a group bearing epoxy functionality and having 6 carbon atoms.

The silicone epoxy resin is used in an amount of up to 20%, preferably 1 to 7%, based on the filler-free reaction resin mixture of polyepoxy resin and polyisocyanate resin.

Preferred polyisocyanate resins are isomer mixtures of diphenylmethane diisocyanate. Also suitable are, for example, toluylene diisocyanate isomer mixtures and prepolymers of diphenylmethane diisocyanate isomer mixtures. Mixtures of said polyisocyanate resins can also be used.

Substituted imidazoles are used as catalysts (i.e. reaction accelerators) for the process of the invention. Preferred are 2-ethyl-4-methylimidazole, 2-phenylimidazole and 1-cyanoethyl-2-phenylimidazole. Other suitable catalysts are, for example, 1,2-dimethylimidazole, 1-cyanoethyl-2-methylimidazole, 2-isopropylimidazole and 1-benzyl-2-phenylimidazole. The catalyst is used in an amount of 0.5 to 2.5%, preferably 1.0 to 1.8%, based on the polyepoxy resin, namely the mixture of the di- and polyfunctional epoxy resins.

Suitable fillers are, in particular, mineral fillers, such as fused quartz with angular (i.e. splintery) and/or spherical particles (of varying particle size distribution). Moreover, ceramic fillers such as aluminum oxide and mixtures of ceramic and mineral fillers can be used. Fibrous fillers, such as short glass fibers, are also suitable.

Whereas according to the prior art, as indicated in particular by the practical examples of said prior art, low catalyst concentrations are used, namely from 0.01 to 0.35% (WO 90/15089) or 0.1% (EP 0 296 450 A1), in both cases based on the polyepoxide, substantially higher amounts of catalyst are needed to prepare reactive, curable prepolymeric epoxy resin mixtures. Hence, in the process according to the invention, the catalyst concentration is from 0.5 to 2.5%, preferably from 1.0 to 1.8%, based on the mixture of di- and polyfunctional epoxy resins. Such high catalyst concentrations are required to ensure the curing of the latently reactive prepolymeric epoxy resin mixture within an industrially relevant time without post-catalysis, which for filler-containing systems would be expensive.

A process for economical conversion of a reaction mixture of polyepoxy and polyisocyanate resins to an oxazolidinone structures-containing, storage-stable, soluble or fusible, latently reactive, curable, prepolymeric epoxy resin mixture in the presence of such high catalyst concentrations on an industrial scale was not known to date. This is due to the necessity to control large amounts of heat generated by the reactions taking place and the phase transitions from the viscous to the solid state and from the solid state back to the viscous state. We have now found that both the large amounts of heat and the phase transitions are controllable if—according to the process of the invention—the preparation of the prepolymeric epoxy resin mixture is carried out with the aid of a continuously operating reactor.

The preparation of epoxy resin materials from epoxy resins and phenols by reaction extrusion is known from EP 0 193 809 A2. The resulting reaction products are chain-extended epoxy resins or resins with phenolic end groups, depending on the molar ratio of epoxy groups to phenolic hydroxyl groups used. The preparation of resin materials by extrusion of epoxy resins and compounds containing thiol, carboxyl, isocyanate, thioisocyanate or secondary amino groups has also been reported, but detailed information about such preparations illustrated by examples is not available. Moreover, the reported experimental conditions are not applicable to epoxide/isocyanate systems.

It is particularly important for the preparation of the epoxy resin mixture according to the invention that the screws of the reaction extruder in the extruder sections that do not serve to mix the components (but serve for carrying out the reaction) are provided exclusively with conveying elements. On the one hand, this ensures that the torque stress of the extruder is minimized and that the shearing and perpendicular forces of the rotating screws will prevent the formation of a region of compact solid material. On the other hand, as a result of a narrow residence time distribution of the extrudate, it ensures exact and uniform temperature control with a uniform temperature profile for the entire extrudate. Moreover, it is essential that the dissipation energy owing to the mechanical action of the screws on the reaction resin mixture be minimized by the exclusive use of conveying elements and that the high reaction enthalpy generated during the melting of the prepolymeric epoxy resin mixture be removed by intensive cooling of the extrudate after it has emerged from the die of the extruder. To this end, the extruder die is designed to produce an extrudate with a maximum surface area—relative to the extrusion volume—and to allow immediate cooling by means of the cooling device located at the extruder die.

Those skilled in the art could not have predicted the possibility that, in the preparation of the prepolymeric epoxy resin mixture according to the invention, the use of a polyfunctional epoxy resin such as tetraglycidyldiamino-diphenylmethane and the said silicone epoxy resins and the use of a high catalyst concentration would not, even at a reaction temperature of up to 200° C., bring about curing, namely chemical crosslinking, with formation of an insoluble, no longer fusible reaction product. Surprisingly, an oxazolidinone structures-containing, storage-stable, soluble or fusible, latently reactive, curable, prepolymeric epoxy resin mixture which is readily curable without post-catalysis, is obtained.

The composition of the reaction resin mixture of polyepoxy resin and polyisocyanate resin used in the process according to the invention differs markedly from that of the reaction mixtures used according to the prior art. In fact, on the one hand, the reaction resin mixtures according to the invention are highly filled (filler content up to 80% and higher) and—because of their high viscosity—require different preparation and handling conditions than do unfilled, low-viscosity reaction resin mixtures. On the other hand, the highly filled reaction resin mixtures are prepared from mixtures of epoxy resins of different chemical structure and different functionality. Such mixtures are not known from the prior art not does the prior art mention the particularly well suited catalyst 1-cyanoethyl-2-phenylimidazole or the silicone epoxy resins of said type, which are important for processing properties, or the tetraglycidyldiaminodiphenyl-methane which is especially useful for raising the glass transition temperature.

The process of the invention is well suited for the industrial production of storage-stable, latently reactive, curable oxazolidinone structures—containing prepolymeric epoxy resin mixtures. The reported conditions will enable those skilled in the art to carry out the process on any required industrial scale.

The following examples illustrate the invention in greater detail.

EXAMPLE 1

A resin component was prepared by blending 2.52 kg of bisphenol A epoxy resin (epoxide content:5.78 mol/kg), 0.155 kg of a silicone epoxide (epoxide content:1.9 mol/kg) prepared as described in Example 9 of EP-OS [OS=unexamined patent application] 0 399 199, and 0.885 kg of a diphenylmethane diisocyanate isomer mixture (isocyanate content:7.9 mol/kg) in a thermostattable, evacuable mixing vessel (effective capacity:20 L) at a temperature of up to 90° C. with mixing. To this mixture were added in portions and with mixing 7.245 kg of spherical fused quartz, 3.105 kg of angular fused quartz and 0.15 kg of carbon black, and the mixture was degassed 1 hr at 90° C. with mixing. A catalyst component was prepared by mixing and then degassing 1.62 kg of tetraglycidyldiamino-diphenylmethane (epoxide content:8.2 mol/kg) and 81.2 g of 2-phenylimidazole at 60° C. in a thermostattable, evacuable mixing vessel (effective capacity:2 L). By means of a peristaltic pump, the resin component was fed to a static mixing tube at a constant rate of 0.1 kg/min. At the same time, the catalyst component was metered into the static mixing tube by means of a gear pump (rate:6.5 g/min). From the static mixing tube, the material was fed to a twin-screw extruder the screws of which were provided with conveying elements. The screw length was 880 mm and the outside screw diameter was 31.8 mm. The five barrel zones of the extruder were heated at 160° C. The screw speed was 20 rpm and the residence time of the material in the twin-screw extruder was 2.5 minutes.

The extrudate emerging from a double slot die (cross-section 1.5 mm×20 mm each) passed over a cooled slide-off ramp and was thereby cooled to 45° C. It was then comminuted by a counter-roll on an attached elastic haul-off belt, and the pre-comminuted extrudate was ground to the desired particle size in an impact mill. The resulting free-flowing, latently reactive, curable oxazolidinone structures-containing prepolymeric epoxy resin mixture (epoxide content:0.89 mol/kg; melting range:75°–95° C.) was stored at room temperature with exclusion of moisture.

EXAMPLE 2

A resin component was prepared by charging to a thermostattable, evacuable mixing vessel (effective capacity:20 L) 2.55 kg of bisphenol A epoxy resin (epoxide content:5.78 mol/kg), 0.155 kg of a silicone epoxide (epoxide content:1.9 mol/kg) prepared as described in Example 9 of EP-OS 0 399 199, 0.81 kg of tetraglycidyldiaminodiphenylmethane (epoxide content:8.2 mol/kg) and 0.885 kg of a diphenylmethane diisocyanate isomer mixture (isocyanate content:7.9 mol/kg) and heating the mixture to 60° C. with mixing. To this mixture were then added in portions and with mixing 6.195 kg of spherical fused quartz, 2.655 kg of angular fused quartz and 0.135 kg of carbon black. The mixture was then degassed 1 hr at 60° C. under reduced pressure (<1 mbar). A catalyst component was prepared by uniformly mixing 1.05 kg of spherical fused quartz, 0.45 kg of angular fused quartz, 0.015 kg of carbon black and 55.5 g of 1-cyanoethyl-2-phenylimidazole. The resin component and the catalyst component were metered simultaneously into a twin-screw extruder, the resin component by means of a peristaltic pump at a rate of 0.042 kg/min and the catalyst component by means of a twin-screw metering device (rate:5 g/min). The screws of the extruder were fitted with conveying elements, and three 28 mm long conveying kneading blocks were provided immediately downstream of the feeding zone for uniform mixing of the resin component with the catalyst component. The screw length was 880 mm and the outside screw diameter was 31.8 mm. The five barrel zones of the extruder were set at the following temperatures:zone 1 (mixing zone):81° C., zone 2: 130° C., zone 3: 177° C., zone 4: 178° C., zone 5: 180° C. The screw speed was 20 rpm and the residence time of the material in the twin-screw extruder was 2.5 minutes.

The extrudate emerging from a double slot die (cross-section 2 mm×20 mm each) passed over a cooled slide-off ramp and was thereby cooled to 43° C. It was then comminuted by a counter-roll on an attached elastic haul-off belt, and the pre-comminuted extrudate was ground to the desired particle size in an impact mill. The resulting free-flowing, latently reactive, curable oxazolidinone structures-containing prepolymeric epoxy resin mixture (epoxide content:0.84 mol/kg; melting range:75°–95° C.) was stored at room temperature with exclusion of moisture.

EXAMPLE 3

A resin component was prepared by charging to a thermostattable, evacuable mixing vessel (effective capacity:50 L) 10.08 kg of bisphenol A epoxy resin (epoxide content:5.78 mol/kg), 0.62 kg of a silicone epoxide (epoxide content:1.9 mol/kg) prepared as described in Example 9 of EP-OS 0 399 199, 3.24 kg of tetraglycidyldiaminodiphenylmethane (epoxide content:8.2 mol/kg) and 3.42 kg of a diphenylmethane diisocyanate isomer mixture (isocyanate content:7.9 mol/kg) and heating the mixture to 80° C. with mixing. To this mixture were then added in portions and with mixing 26.084 kg of spherical fused quartz, 11.18 kg of angular fused quartz, 0.3 kg of polyethylene wax and 0.54 kg of carbon black. The mixture was then degassed 1 hr at 60° C. under reduced pressure (<1 mbar). A catalyst component was prepared by uniformly mixing 2.9 kg of spherical fused quartz, 1.244 kg of angular fused quartz, 0.06 kg of carbon black and 222 g of 1-cyanoethyl-2-phenylimidazole. The resin component and the catalyst component were metered simultaneously into a twin-screw extruder, the resin component by means of a membrane metering pump at a constant rate of 0.25 kg/min and the catalyst component by means of a twin-screw metering device at a constant rate of 21 g/min. The screws of the extruder were fitted with conveying elements, and three 40 mm long conveying kneading blocks were provided immediately downstream of the feeding zone for uniform mixing of the resin component with the catalyst component. The screw length was 1485 mm and the outside screw diameter was 42 mm. The six barrel zones of the extruder were set at the following temperatures:zone 1 (mixing zone):75° C., zone 2: 120° C., zone 3: 170° C., zone 4: 175° C., zone 5: 175° C., zone 6: 170° C. The screw speed was 25 rpm and the residence time of the material in the twin-screw extruder was 2.4 minutes.

The extrudate emerging from a double slot die (cross-section 3 mm×25 mm each) passed over a cooled slide-off ramp and was thereby cooled to 45° C. It was then comminuted by a counter-roll on an attached elastic haul-off belt, and the pre-comminuted extrudate was ground to the desired particle size in an impact mill. The resulting free-flowing, latently reactive, curable oxazolidinone structures-containing prepolymeric epoxy resin mixture (epoxide content:0.87 mol/kg; melting range:75°–95° C.) was stored at room temperature with exclusion of moisture.

EXAMPLE 4

A resin component was prepared by charging to a thermostattable, evacuable mixing vessel (effective capacity:100 L) 25.2 kg of bisphenol A epoxy resin (epoxide content:5.78 mol/kg), 1.55 kg of a silicone epoxide (epoxide content:1.9 mol/kg) prepared as described in Example 9 of EP-OS 0 399 199, 8.1 kg of tetraglycidyldiaminodiphenylmethane (epoxide content: 8.2 mol/kg) and 8.85 kg of a diphenylmethane diisocyanate isomer mixture (isocyanate content:7.9 mol/kg) and heating the mixture to 80° C. with mixing. To this mixture were then added in portions and with mixing 61.95 kg of spherical fused quartz, 26.55 kg of angular fused quartz and 1.35 kg of carbon black. The mixture was then degassed 1 hr at 80° C. under reduced pressure (<1 mbar). A catalyst component was prepared by uniformly mixing 10.5 kg of spherical fused quartz, 4.0 kg of angular fused quartz, 0.15 kg of carbon black and 417 g of 2-phenylimidazole. The resin component and the catalyst component were metered simultaneously at constant rates into a twin-screw extruder, the resin component by means of a membrane metering pump (rate:2 kg/min) and the catalyst component by means of a twin-screw metering device (rate:238 g/min). The screws of the extruder were fitted with conveying elements, and nine 80 mm long conveying kneading blocks were provided immediately downstream of the feeding zone for uniform mixing of the resin component with the catalyst component. The screw length was 3480 mm and the outside screw diameter was 91.8 mm. The ten barrel zones of the extruder were set at the following temperatures: zones 1 and 2 (mixing zones): 81° C., zone 3: 130° C., zones 4 to 8: 175° C., zone 9: 173° C., zone 10: 170° C. The screw speed was 20 rpm and the residence time of the material in the twin-screw extruder was 2.8 minutes.

Further processing was as described in Example 3. The resulting free-flowing, latently reactive, curable oxazolidinone structures-containing prepolymeric epoxy resin mixture (epoxide content:0.85 mol/kg; melting range: 75°–95° C.) was stored at room temperature with exclusion of moisture.

What is claimed is:

1. A process for producing an epoxyoxazolidinone prepolymer mixture, comprising the steps of: feeding a filler-containing, thermally-polymerizable reaction resin component comprising a mixture of a polyepoxy resin, comprising a mixture of di- and polyfunctional epoxy resins, and a polyisocyanate, with a molar ratio of epoxide groups to isocyanate groups of >1, to a continuously working reactor; reacting the reaction resin mixture at a reaction temperature of up to 200° C., the reactor temperature being from 140° to 190° C., in the presence of a catalyst component comprising an inertly substituted imidazole as a catalyst, the catalyst being used in an amount of 0.5 to 2.5% by weight based on the polyepoxy resin; and cooling extrudate emerging from an outlet die of the reactor to a temperature of <50° C. by means of a cooling device located at the outlet die of the reactor.

2. The process according to claim 1 wherein the filler-containing resin component is prepared from a polyepoxy resin and a polyisocyanate at a temperature of up to 100° C.

3. The process according to claim 1 wherein the catalyst component is prepared from the catalyst and one of the components of the reaction resin mixture or part thereof.

4. The process according to claim 2 wherein the resin component and the catalyst component are fed to a static mixing tube, and the reaction resin mixture discharged from the mixing tube is fed to the reactor.

5. The process according to claim 3 wherein the resin component and the catalyst component are fed to a static mixing tube, and the reaction resin mixture discharged from the mixing tube is fed to the reactor.

6. The process according to claim 1 wherein the catalyst component is prepared from the catalyst and a part of the filler.

7. The process according to claim 2 wherein the resin component and the catalyst component are fed to the reactor separately.

8. The process according to claim 6 wherein the resin component and the catalyst component are fed to the reactor separately.

9. The process according to claim 1 wherein the catalyst content of the reaction resin mixture is from 1.0 to 1.8%, based on the polyepoxy resin.

10. The process according to claim 1 wherein the epoxy resin is selected from the group consisting of a bisphenol A epoxy resin, a bisphenol F epoxy resin, a phenol novolak epoxy resin, a cresol novolak epoxy resin, a silicone epoxy resin, triglycidyl isocyanurate, tetraglycidyldiamino-diphenylmethane and a polyglycidylphosphorus resin.

11. The process according to claim 1 wherein the polyisocyanate is an isomer mixture of diphenylmethane diisocyanate or of toluylene diisocyanate or a prepolymer of a diphenylmethane diisocyanate isomer mixture.

12. The process according to claim 1 wherein the catalyst is 2-ethyl-4-methylimidazole, 2-phenylimidazole or 1-cyanoethyl-2-phenylimidazole.

13. The process according to claim 1 wherein the continuously working reactor is a twin-screw extruder characterized by a ratio of screw length to outside screw diameter of 20 to 50.

14. The process according to claim 13 wherein the reactor includes shafts consisting of conveying screw elements or of conveying screw elements and kneading elements, and wherein the residence time of the material, at a screw speed of >10 rpm and with minimum axial backflow, is <5 minutes.

15. The process according to claim 1 wherein the resin component comprises at least 80% filler on a weight basis.

16. The process according to claim 1 wherein the mixture of di-and polyfunctional epoxy resins has a molar ratio of polyfunctional to difunctional epoxy resin in the range of about 0.1 to about 1.7, based on the epoxy groups.

17. The process according to claim 1 wherein the mixture of di- and polyfunctional epoxy resins has a molar ratio of polyfunctional to difunctional epoxy resin in the range of about 0.2 to about 0.75, based on the epoxy groups.

* * * * *